United States Patent
Wen et al.

(10) Patent No.: US 11,492,440 B2
(45) Date of Patent: Nov. 8, 2022

(54) CLEARCOAT COMPOSITIONS AND METHODS OF FORMING CLEARCOAT COMPOSITIONS

(71) Applicant: AXALTA COATING SYSTEMS IP CO., LLC, Wilmington, DE (US)

(72) Inventors: Mei Wen, Chesterbrook, PA (US); Iain Harvey, Hatfield, PA (US)

(73) Assignee: AXALTA COATING SYSTEMS IP CO., LLC, Wilmington, DE (US)

(*) Notice: Subject to any disclaimer, the term of this patent is extended or adjusted under 35 U.S.C. 154(b) by 207 days.

(21) Appl. No.: 16/047,457

(22) Filed: Jul. 27, 2018

(65) Prior Publication Data
US 2020/0031982 A1 Jan. 30, 2020

(51) Int. Cl.
| | | |
|---|---|---|
| *C08G 18/10* | (2006.01) | |
| *C08G 18/38* | (2006.01) | |
| *C08G 18/42* | (2006.01) | |
| *C08G 18/66* | (2006.01) | |
| *C08G 18/73* | (2006.01) | |
| *C09D 175/12* | (2006.01) | |
| *C08G 18/32* | (2006.01) | |
| *C08G 18/79* | (2006.01) | |
| *C08G 18/80* | (2006.01) | |
| *C09D 175/06* | (2006.01) | |
| *C08G 18/40* | (2006.01) | |
| *C08G 18/64* | (2006.01) | |
| *C08G 18/46* | (2006.01) | |

(52) U.S. Cl.
CPC ......... *C08G 18/10* (2013.01); *C08G 18/3819* (2013.01); *C08G 18/4277* (2013.01); *C08G 18/4623* (2013.01); *C08G 18/6633* (2013.01); *C08G 18/73* (2013.01); *C09D 175/12* (2013.01)

(58) Field of Classification Search
None
See application file for complete search history.

(56) References Cited

U.S. PATENT DOCUMENTS

| | | | |
|---|---|---|---|
| 5,942,072 A | 8/1999 | McKinnon | |
| 6,747,117 B2 | 6/2004 | Gajewski | |
| 7,611,772 B2 | 11/2009 | Barancyk et al. | |
| 7,736,745 B2 | 6/2010 | Hong | |
| 7,927,704 B2 | 4/2011 | Mager et al. | |
| 7,928,160 B2 | 4/2011 | Senkfor et al. | |
| 8,124,235 B2 | 2/2012 | Hong | |
| 8,178,205 B2 | 5/2012 | Hong | |
| 8,334,347 B2 | 12/2012 | Ding et al. | |
| 8,557,388 B2 | 10/2013 | Hong | |
| 8,889,798 B2 | 11/2014 | Duijghuisen et al. | |
| 9,663,663 B2 | 5/2017 | Hong | |
| 9,732,232 B2 | 8/2017 | Hong | |
| 9,944,821 B2 | 4/2018 | Squiller et al. | |
| 2003/0232954 A1 | 12/2003 | Gajewski | |
| 2005/0271881 A1 | 12/2005 | Hong | |
| 2006/0046068 A1 | 3/2006 | Barancyk et al. | |
| 2006/0068198 A1 | 3/2006 | Bratys et al. | |
| 2007/0078255 A1 | 4/2007 | Mager et al. | |
| 2007/0248830 A1 | 10/2007 | Brier et al. | |
| 2010/0203251 A1 | 8/2010 | Ding et al. | |
| 2010/0239815 A1 | 9/2010 | Senkfor et al. | |
| 2010/0249295 A1 | 9/2010 | Hong | |
| 2010/0255279 A1 | 10/2010 | Hong | |
| 2010/0256296 A1 | 10/2010 | Hong | |
| 2011/0003913 A1 | 1/2011 | Duijghuisen et al. | |
| 2011/0294934 A1* | 12/2011 | Wamprecht | C08G 18/10 524/284 |
| 2012/0279640 A1 | 11/2012 | Hong | |
| 2013/0203934 A1 | 8/2013 | Best et al. | |
| 2014/0011935 A1 | 1/2014 | Hong | |
| 2014/0039119 A1 | 2/2014 | Hong | |
| 2016/0024339 A1 | 1/2016 | Squiller et al. | |
| 2017/0058146 A1 | 3/2017 | Enkish-Krug et al. | |
| 2017/0218225 A1 | 8/2017 | Enkish-Krug et al. | |
| 2018/0002530 A1 | 1/2018 | Hong | |
| 2020/0010723 A1* | 1/2020 | Takeno | C08G 18/7837 |

FOREIGN PATENT DOCUMENTS

| | | | |
|---|---|---|---|
| CN | 110256996 A | * | 9/2019 |
| DE | 19635616 C1 | | 9/1997 |
| DE | 102005047562 A1 | | 4/2007 |
| DE | 102015108232 A1 | | 12/2016 |
| EP | 3098247 A1 | | 11/2016 |
| JP | 2010248303 A | * | 11/2010 |
| WO | 2008082687 A2 | | 7/2008 |
| WO | 2009096778 A1 | | 6/2009 |

(Continued)

OTHER PUBLICATIONS

Nippon Polyurethane Industry, "Product Information, Coronate HX," pp. 1-4, 2010. (Year: 2010).*
Anonymous, Desmodur® N 3300 Product Datasheet, Coatings, Adhesives & Specialties, Jun. 1, 2017, Covestro Deutschland AG, Leverkusen, Germany.
Anonymous, Desmodur® N 3300 Saftety Datasheet, Coatings, Adhesives & Specialties, Mar. 6, 2020, Covestro Deutschland AG, Leverkusen, Germany.

*Primary Examiner* — Randy P Gulakowski
*Assistant Examiner* — Ha S Nguyen
(74) *Attorney, Agent, or Firm* — Lorenz & Kopf LLP

(57) ABSTRACT

Clearcoat compositions and methods for forming a clearcoat compositions are provided. In one example, a clearcoat composition includes a binder portion A that includes a polyaspartic ester resin. An activator portion B includes a polyol-modified isocyanate that is a reaction product of a polyisocyanate component and a polyol component. The polyol component includes polycaprolactone polyol.

19 Claims, No Drawings

(56) References Cited

FOREIGN PATENT DOCUMENTS

| | | |
|---|---|---|
| WO | 2011126562 A2 | 10/2011 |
| WO | 2014151307 A1 | 9/2014 |
| WO | 2016210237 A1 | 12/2016 |

\* cited by examiner

CLEARCOAT COMPOSITIONS AND METHODS OF FORMING CLEARCOAT COMPOSITIONS

TECHNICAL FIELD

The technical field relates generally to coatings, and more particularly to aspartate clearcoat compositions and methods for forming such clearcoat compositions.

BACKGROUND

Compositions based on isocyanate chemistry find utility as components in coatings, such as, for example, paints, primers, and the like. Isocyanate-based coating compositions may include, for example, polyurethane or polyurea coatings formed from resins that contain hydroxyl or amine functional groups to react with isocyanates such as, for example, diisocyanates, polyisocyanates, and/or the like. These resins may cure by various mechanisms so that covalent bonds form between the resin components, thereby producing a cross-linked polymer network.

Scratch resistance of coatings, particularly clearcoat coatings that overlie, for example, a primer and a basecoat, whether for OEM or refinishing applications, have always been a challenge in the coating industry. If a coating is scratched, the clearcoat layer(s) is compromised at least from an aesthetic standpoint. As such, the coating industry is constantly looking for ways to improve scratch resistance.

Polyurea coatings based on aspartate chemistry is often desirable for clearcoat applications, for example, from a refinishing standpoint because the aspartate chemistry helps produce clearcoats having relatively fast cure rates and good appearance. Refinishing shops, for example, desire clearcoat systems that are going to cure fast with good appearance for efficiency and economic reasons.

Accordingly, it is desirable to provide aspartate-based clearcoat compositions with improved scratch resistance, and methods of forming such clearcoat compositions. Furthermore, other desirable features and characteristics of the present disclosure will become apparent from the subsequent detailed description and the appended claims, taken in conjunction with this background.

BRIEF SUMMARY

Clearcoat compositions and methods for forming a clearcoat compositions are provided herein. In accordance with an exemplary embodiment, a clearcoat composition includes a binder portion A that includes a polyaspartic ester resin. An activator portion B includes a polyol-modified isocyanate that is a reaction product of a polyisocyanate component and a polyol component. The polyol component includes polycaprolactone polyol.

In accordance with another exemplary embodiment, a clearcoat composition includes a binder portion A that includes a polyaspartic ester resin. An activator portion B includes a polyol-modified isocyanate that is a reaction product of a polyisocyanate component and a polyol component. The polyisocyanate component has —NCO reactive groups, the polyol component has —OH reactive groups, and the polyaspartic ester resin has >NH reactive groups. The clearcoat composition has an isocyanate index defined by (moles of —NCO reactive groups)/(moles of —OH reactive groups+moles of >NH reactive groups) of from about 0.8 to about 1.45.

In accordance with another exemplary embodiment, a method of forming a clearcoat composition is provided. The method includes forming a binder portion A that includes a polyaspartic ester resin. An activator portion B is formed including providing a polyisocyanate component and a polyol component for reacting with the polyisocyanate component to form a polyol-modified isocyanate. The polyisocyanate component has —NCO reactive groups, the polyol component has —OH reactive groups, and the polyaspartic ester resin has >NH reactive groups. The polyol component includes polycaprolactone polyol and/or the clearcoat composition has an isocyanate index defined by (moles of —NCO reactive groups)/(moles of —OH reactive groups+moles of >NH reactive groups) of from about 0.8 to about 1.45.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

Various embodiments contemplated herein relate to clearcoat compositions and methods of forming a clearcoat compositions. In an exemplary embodiment, a clearcoat composition is a multi-component system (e.g., two-component system) and includes a binder portion A and an activator portion B. The binder portion A includes, among other ingredients, a polyaspartic ester resin. The activator portion B includes, among other ingredients, a polyol-modified isocyanate that is a reaction product of a polyisocyanate component and a polyol component.

In an exemplary embodiment, the clearcoat composition is applied onto a substrate to form a clearcoat, for example, as either an original clearcoat, or alternatively, as a repair or refinish clearcoat. The substrate may include an object that is coated with a primer, a basecoat, and optionally, a clearcoat layer(s) in need of being repaired. The clearcoat composition may be applied to the substrate using methods known and customary in coatings technology, such as via spraying, or the like to deposit one or more layers of the mixture of the binder portion A and the activator portion B onto the substrate.

The binder portion A including the polyaspartic ester resin reacts with the activator portion B including the polyol-modified isocyanate to form a polyurea clearcoat with improved scratch resistance. Without being limited by theory, in an exemplary embodiment, it is believed that reacting the polyol component with the isocyanate component to form the polyol-modified isocyanate incorporates a relatively flexible and high crosslinked structure from the polyol component into the polyol-modified isocyanate that advantageously helps improve scratch resistance of the resulting clearcoat while maintaining a relatively fast cure rate and good appearance that are often associated with aspartate-based clearcoat systems.

As discussed above, the binder portion A includes the polyaspartic ester resin. The polyaspartic ester resin is an amine functional resin including >NH reactive groups with an aspartate component that includes the following general formula:

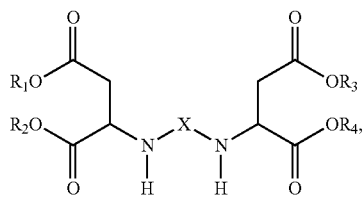

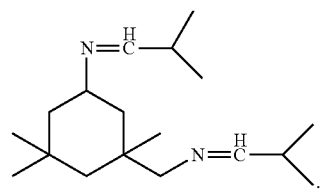

wherein $R_1$, $R_2$, $R_3$, and $R_4$ may be the same or different and represent hydrogen or organic groups that are inert towards isocyanate groups; and X represents a divalent organic group, obtained by removal of the amino groups from a primary diamine. In an exemplary embodiment, the polyaspartic ester resin includes a chain-extended aspartate prepolymer that is a reaction product of a mixture including at least one di-aspartic acid ester and at least one amino-functional mono-aspartic acid ester with a di-functional isocyanate. The polyaspartic ester resin is synthesized in a solvent and the resin solution is used directly. Non-limiting examples of polyaspartic ester resins including chain-extended aspartate prepolymers are described in U.S. Patent Application Publication No. 2017/0058146, filed Aug. 19, 2016, and U.S. Patent Application Publication No. 2017/0218225, filed Aug. 19, 2016, which are commonly owned by the assignee of the present application and are hereby incorporated by reference in their entirety for all purposes.

In addition to the polyaspartic ester resin, the binder portion A may further include other ingredients (e.g., additive(s), solvent(s), reactive diluent(s), and/or the like) that are added, mixed, blended, incorporated, or otherwise combined with the polyaspartic ester resin. In an exemplary embodiment, the binder portion A optionally includes a reactive blocked amine diluent to help reduce the viscosity of the binder portion A and increase the crosslink density of the networks formed during curing of the clearcoat composition.

In one example, the reactive blocked amine diluent is aldimine which has a general structure as follows:

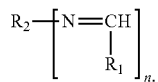

where $R_1$ represents aliphatic organic groups that are inert towards isocyanate groups, $R_2$ represents an organic group, and n is an integer ranging from 1 to 4. As will be discussed in further detail below, in an exemplary embodiment, the amount of aldimine in the total solids of the clearcoat composition is from about 0 to about 40 wt. %, such as from about 0 to about 15 wt. %, for example, if present, from about 0.1 to about 40 wt. %, such as from about 0.1 to about 15 wt. %. Aldimine is commercially available under the trade name VESTAMIN® A 139 from Evonik Resource Efficiency GmbH, located at Rellinghauser Strasse 1-11, 45128 Essen, Germany. VESTAMIN® A 139 is isophorone diamine isobutyraldimine and has the following structure:

The binder portion A can further contain coating additives usually used in the paint industry. Non-limiting examples of such additives are UV absorbers, light stabilizers, for example, HALS (hindered amine light stabilizer) compounds, flow control agents, for example, based on (meth)acrylic homopolymers or silicon oils, rheology-influencing agents, such as silica, preferably highly dispersed silicic acid, or sag control agents, thickeners, such as cross-linked polycarboxylic acid or polyurethanes, anti-foaming agents and wetting agents. The additives are added in the usual amounts familiar to a person skilled in the art and may be used in one and/or both components (i.e., binder portion A and/or activator portion B) of the multi-component system.

In an exemplary embodiment, the binder portion A further includes an organic solvent or a mixture of organic solvents as a liquid carrier. In one example, the organic solvent is n-butyl acetate, which is commercially available from BASF SE, Germany, Celanese, USA or Oxea GmbH, Germany.

As discussed above, the binder portion B includes a polyol-modified isocyanate that is the reaction product of a polyisocyanate component and a polyol component for improving the scratch performance of the resulting clearcoat. The polyol component may include a single kind of polyol or mixture of different polyols. In an exemplary embodiment, the polyol component includes polyol(s) having a molecular weight of from about 62 to about 10,000, for example from about 100 to about 3000, as determined by the functionality and equivalent weight (calculated from OH number) or determined by the number average molecular weight (i.e., $M_N$), for example, via gel permeation chromatography (GPC) or the like. In an exemplary embodiment, the polyol component includes a single type of polyol having a functionality of from about 1.5 to about 6, such as from about 2 to about 4. The polyol component can also include a mixture of different polyols and/or alcohols. Non-limiting examples of polyols of the polyol component include polycaprolactone polyols, polyester polyols, polyether polyols, polyacrylate polyols, polycarbonate polyols, polyurethane polyols, polyacetal polyols, polyester amide polyols, and polythioether polyols. Further, the polyol component may include small alcohols such as aliphatic dialcohols, trialcohols, or tetra-functional alcohols. The polyol component may include a mixture of polyols of the same type or different types of polyols, and/or a mixture of polyols with mono-functional alcohols.

In an exemplary embodiment, the polyol component includes one or more types of polycaprolactone polyols. Polycaprolactone polyols are aliphatic polyester polyols produced by the ring-opening polymerization of ε-caprolactone. The ring-opening polymerization process results in relatively low viscosity polyols of defined functionality. In an exemplary embodiment, the polycaprolactone polyols have a relatively low molecular weight ($M_N$) of from about 200 to about 2000, a functionality of from about 2 to about 4, and an OH equivalent weight of from about 80 to about 1000 g/equivalents of OH, such as from about 98 to about 302 g/equivalents of OH. Nonlimiting examples of commercially available polycaprolactone polyols are Capa™ 2043, 2047 A, 2054, 2067A, 2077A, 2085, 2101A, 2100, 3121J, 3022, 3031, 3050, 3091, 4101, 7201A, and 8025D, sold by Perstorp Holding AB, located at Neptunigatan 1, SE-211 20 Malmö. Provided below are the chemical structures for tri-functional (Triol) and tetra-functional (Tetrol) Capa™ polyols followed by Table 1 that includes associated molecular information for Capa™ 3031, 3050, 3091, and 4101 polyols.

Chemical Structures of tri-functional and tetra-functional Capa™ polyols and Table 1 are as follows:

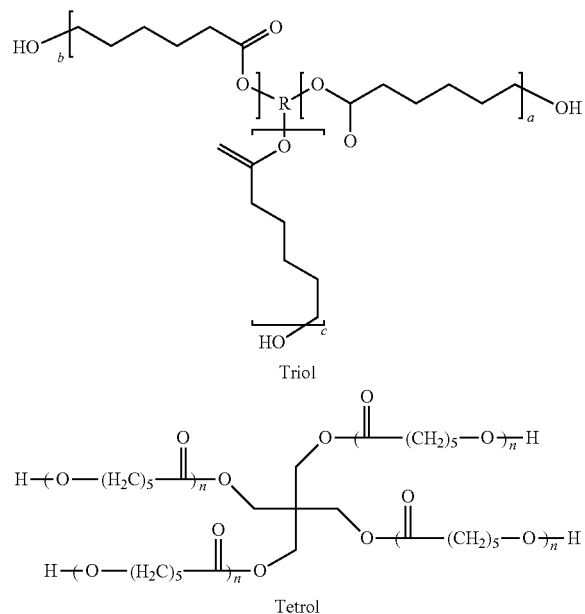

Triol

Tetrol

TABLE 1

| Features | Capa ™ 3031 | Capa ™ 3050 | Capa ™ 3091 | Capa ™ 4101 |
|---|---|---|---|---|
| OH value | 570.21 | 306 | 186.03 | 225.56 |
| Functionality | 3 | 3 | 3 | 4 |
| Equivalent Wt. (g/mol) | 98.38 | 183.33 | 301.56 | 248.71 |
| Solids | 100% | 100% | 100% | 100% |

As will be discussed in further detail below, in an exemplary embodiment, the polyol component, which has —OH reactive groups, is added to the polyisocyanate component, which has excess —NCO reactive groups, and the polyol and polyisocyanate components are allowed to react to consume the —OH groups to form the polyol-modified isocyanate. In an exemplary embodiment, a ratio of the polyol component to the polyisocyanate component is larger than about 0 and less than an amount that would otherwise cause the mixture of components to gel. This amount depends on the functionalities and equivalent weights of the polyol and polyisocyante components. In an exemplary embodiment, a molar ratio defined by (moles of the —OH reactive groups of the polyol component)/(moles of the —NCO reactive groups of the polyisocyanate component) is from about 0.01 to about 0.99, for example from about 0.01 to about 0.5. Further, in an exemplary embodiment, an isocyanate index defined by (moles of —NCO reactive groups of the polyisocyanate component)/(moles of —OH reactive groups of the polyol component+moles of >NH reactive groups of the polyaspartic ester resin) is from about 0.8 to about 2, such as from about 0.8 to about 1.6, such as from about 0.8 to about 1.45, such as from about 1 to about 1.45, for example from about 1 to about 1.4.

The polyisocyanate component may include a single kind of isocyanate or a mixture of different isocyanates that have free isocyanate groups (i.e., —NCO reactive groups). The free isocyanates can be any organic polyisocyanate with aliphatically, cycloaliphatically, araliphatically and/or aromatically bound free isocyanate groups. Polyisocyanate component may include at least one curing agent having free isocyanate groups such as a polyisocyanate or polyisocyanate mixture with exclusively aliphatically and/or cycloaliphatically bound isocyanate groups with an average —NCO functionality of from about 1.5 to about 6.0, such as from about 1.8 to about 4.0.

Nonlimiting examples of the polyisocyanate component include one or more polyisocyanates selected from hexamethylene diisocyanate (HDI), 1-isocyanato-3,3,5-trimethyl-5-isocyanatomethyl-cyclohexane (IPDI), bis(isocyanatocyclohexyl)-methane and their derivatives, 2,2',5 trimethylhexane diisocyanate and mixtures thereof and reaction products thereof such as trimers of HDI or IPDI. Further, the at least one curing agent having free isocyanate groups is selected from trimers of hexamethylene diisocyanate (HDI), 1-isocyanato-3,3,5-trimethyl-5-isocyanatomethyl-cyclohexane (IPDI), 2,2',5 trimethylhexane diisocyanate and mixtures or copolymers thereof. In an exemplary embodiment, the at least one curing agent having free isocyanate groups is trimer of hexamethylene diisocyanate (HDI) or 1-isocyanato-3,3,5-trimethyl-5-isocyanatomethyl-cyclohexane (IPDI). Sterically hindered curing agent having free isocyanate groups are also suitable. Examples of these are 1,1,6,6-tetramethyl-hexamethylene diisocyanate, p- or m-tetramethylxylylene diisocyanate and the appropriate hydrated homologues. In an exemplary embodiment, HDI trimer is available under the trade name Desmodur® N 3300A from Covestro, LLC, which is headquartered at 1 Covestro Circle, Pittsburgh, Pa. 15205.

In an exemplary embodiment, the polyol-modified isocyanate can be a mixture of multiple polyol-modified isocyanates (e.g., a few polyol-modified isocyanates) or a mixture of one or a few polyol-modified isocyanate(s) with the same or different non-modified isocyanates as listed above.

The activator portion B may optionally include a catalyst for promoting the reaction between the binder portion A and the activator portion B. In an exemplary embodiment, the catalyst is dibutyltin dilaurate, which is commercially available under the trade name of FASCAT® 4202 from PMC Group, Linc. Located at 1288 Route 73, Mount Laurel, N.J. 08054. In an exemplary embodiment, the catalyst is present in an amount of from about 0 to about 1500 ppm by solids of the clearcoat composition. Other catalyst for promoting a reaction between a polyaspartic ester resin and isocyanate (e.g., polyol-modified isocyanate) known to those skilled in the art may be used, such as for example other organometallic catalyst, acid catalyst, or the like.

The activator portion B can further contain coating additives usually used in the paint industry. Non-limiting examples of such additives are light stabilizers, for example, UV absorbers, HALS (hindered amine light stabilizer) compounds, flow control agents, for example, based on (meth) acrylic homopolymers or silicon oils, rheology-influencing agents, such as silica, preferably highly dispersed silicic acid, or sag control agents, thickeners, such as cross-linked polycarboxylic acid or polyurethanes, anti-foaming agents and wetting agents. The additives are added in the usual amounts familiar to a person skilled in the art and may be used in one and/or both components (i.e., binder portion A and/or activator portion B) of the multi-component system.

In an exemplary embodiment, the activator portion B further includes an organic solvent or a mixture of organic solvents as a liquid carrier. In one example, the organic solvent is n-butyl acetate.

In an exemplary embodiment, the clearcoat composition is formed by forming the binder portion A including the polyaspartic ester resin solution and any other ingredients as discussed above, for example by mixing the polyaspartic ester resin solution and the other ingredients to form a homogeneous solution. In an exemplary embodiment, the binder portion A is formed including the polyaspartic ester resin (non-volatile components) present in an amount of from about 15 to about 60 wt. % based on the solids of the clearcoat composition.

The activator portion B is formed by providing the polyisocyanate component and the polyol component as discussed above to form the polyol-modified isocyanate. In an exemplary embodiment, forming the polyol-modified isocyanate includes mixing an activator precursor portion that includes the polyisocyanate component and, for example, any other ingredients as discussed above, for example by mixing the polyisocyanate component and the other ingredients to form a homogeneous solution. The polyol component is then gradually incorporated into the activator precursor portion during mixing. In an exemplary embodiment, the polyol component is gradually incorporated into the activator precursor portion for a time of from about 30 seconds to a few hours depending on the amount of materials and agitation. In an exemplary embodiment, the polyisocyanate component is present in an amount of from about 20 to about 55 wt. % based on the total solids of the clearcoat composition and the polyol component is present in an amount of from about 1 to about 7 wt. % based on the solids of the clearcoat composition.

After the polyol component is incorporated into the activator precursor portion, the activator precursor portion is continuously mixed, for example, until the —OH groups of the polyol component are substantially fully consumed by the excess —NCO groups of the polyisocyanate component to form the polyol-modified isocyanate. In an exemplary embodiment, the polyisocyanate component and the polyol component are allowed to react at room temperature for a time of from about 1 to about 12 hours to consume the —OH groups of the polyol component. This reaction time can be shortened when heating is used.

The following examples are provided for illustration purposes only and are not meant to limit the various embodiments of the clearcoat composition in any way.

EXAMPLES

E-coated panels were prepared with the clearcoat composition for scratch resistance testing. In particular, the binder portion A and the activator portion B were mixed together to form a homogenous solution. The homogeneous solution was then sprayed with a spray gun onto the e-coated panels in which each of the e-coated panels had a primer or sealer layer adjacent to the e-coat, and a basecoat (e.g., water-based basecoat) disposed thereon. Spraying was conducted using a two-coat process with about 30 seconds of flash in between the coats. After spraying, the clearcoat composition was allowed to flash for a time of from about 3 to about 5 minutes, and then the coated panels were placed in an oven operating at 110° F. and allowed to bake for about 10 minutes. The coated panels were then allowed to age for about two weeks to allow substantial full curing of the clearcoat composition before conducting the scratch resistance testing as discussed in further detail below. The thickness of the substantially fully cured clearcoat was about 50 μm.

Scratch resistance testing was conducted on the coated panels using the Amtec Test per DIN EN ISO 20566, which mimics a car wash. Per the Amtec Test, the coated panels were scratched with plastic brushes with the presence of a slurry. The scratched coated panels went through a baking process at about 60 or about 80° C. for recovery. The gloss values of the coatings before and after the Amtec Test, and after the scratch recovery were measured. Desirable gloss retention levels of the scratched coatings right after scratch and after scratch recovery depend on OEM manufactures, but typically values of about 70% or higher after scratch, and about 75% or higher after scratch recovery are highly desirable.

Tables 2-4 shown below provide examples of adding Capa™ polyols 3031 or 4101 to the activator portion B for aspartate clearcoat modification without aldimine and with a ratio of NCO(OH+NH)=1.27. Table 3 provides detailed formulation information. The binder portion A includes a polyaspartic ester resin solution, an aldimine, butyl acetate, some flow additives and UV additives. The activator portion B includes aliphatic polyisocyanate (HDI trimer), Desmodur N 3300, catalyst dibutyltin dilaurate, butyl acetate, and other additives. Table 4 shows the gloss retention of the testing clearcoats after Ametc Test and after baking at 60° C. for one hour or after baking at 80° C. for two hours. Clearcoats modified with the Capa™ polyols all showed improvement on the gloss retention after scratch and scratch recovery.

Tables 5-7 provide examples of adding Capa™ 4101 to the activator portion B in which the OH/NCO molar ratio was 0.093 for aspartate clearcoat modification with different levels of aldimine VESTAMIN A 139 from about 0 to about 13.3 wt. % by solids and at a ratio of NCO/(OH+NH) of about 1.4. As indicated, higher aldimine levels provided improved scratch resistance and scratch recovery performance.

Tables 8-10 provide examples of adding Capa™ 3031 or 4101 to the activator portion B for aspartate clearcoat modification at about 13.3 wt. % of aldimine VESTAMIN A 139 level by solids and a ratio of NCO/(OH+NH) of about 1.2. Clearcoats modified with the Capa™ polyol all showed improvement on the gloss retention after scratch and scratch recovery.

Table 11 provides an example of formulation F and its gloss retention after the Amtec Test, and after baking at about 60° C. for about 1 hour or about 80° C. for about 2 hours post the Amtec Test. Sample F has an elongation at break of 14.4% and T(g) of about 91° C., illustrating the clearcoats are relatively glassy coatings (T(g) higher than room temperature) with elongation at break of no more than 50%.

TABLE 2

Formulations of adding Capa ™ polyols to the activator portion B for aspartate clearcoat modification without aldimine and a ratio of NCO/(OH + NH) = 1.27.

| Sample index | E1 | E2 | E3 |
|---|---|---|---|
| polyol % in activator solution | 0% | 4% Capa ™ 3031 | 5% Capa ™ 4101 |
| OH/NCO molar ratio | 0.000 | 0.153 | 0.076 |

TABLE 3

Details of formulations for the samples listed in Table 2.

| | | E1 | E2 | E3 |
|---|---|---|---|---|
| Part A | Polyaspartic ester resin solution | 44.31 | 39.39 | 41.01 |
| | butyl acetate | 11.08 | 9.85 | 10.25 |
| | flow additives | 0.65 | 0.65 | 0.65 |
| | UV additives | 2.60 | 2.60 | 2.60 |
| | sum1 | 58.63 | 52.48 | 54.52 |
| Part B | Desmodur N 3300A | 18.13 | 20.00 | 18.58 |
| | 10% wt Dibutyltin dilaurate in butyl acetate | 0.10 | 0.10 | 0.10 |
| | Other additives | 4.97 | 4.97 | 4.97 |
| | butyl acetate | 18.16 | 20.87 | 19.97 |
| | Mixing | Roll the above mixture in Part B first fully. Then add the amount of Capa ™ polyol shown below slowly in the course of 30 seconds to 1 hour under stirring to react with the isocyanate. The reaction can take about 1-12 hours to complete. Purge with Nitrogen. Mix the solution during reaction. | | |
| | Capa ™ 3031 | 0.00 | 1.57 | 0.00 |
| | Capa ™ 4101 | 0.00 | 0.00 | 1.85 |
| | sum2 | 41.37 | 47.52 | 45.48 |
| total | | 100 | 100 | 100 |

TABLE 4

Gloss retention of clearcoats after Amtec Test, and after baking at 60° C. for 1 hour or 80° C. for 2 hours post the Amtec Test for examples shown in Table 2.

| sample index | gloss retention after Amtec but before baking at 60° C. | gloss retention after Amtec and after baking at 60° C. for 1 h | gloss retention after Amtec but before baking at 80° C. | gloss retention after Amtec and after baking at 80° C. for 2 h |
|---|---|---|---|---|
| E1 | 53.5% | 61.1% | 54.4% | 63.0% |
| E2 | 69.3% | 75.2% | 68.1% | 75.6% |
| E3 | 62.2% | 71.0% | 67.7% | 74.3% |

TABLE 5

Formulations of adding Capa polyol 4101 to the activator portion B (OH/NCO molar ratio is 0.093) for aspartate clearcoat modification with different levels of aldimine VESTAMIN A 139 (by the solids of the coating solutions) and a ratio of NCO/(OH + NH) = 1.4.

| Sample Index | S1 | S2 | S3 |
|---|---|---|---|
| VESTAMIN A 139 in total solids | 0% | 7% | 13.3% |

TABLE 6

Detailed formulations of examples in Table 5.

| | | S1 | S2 | S3 |
|---|---|---|---|---|
| Part A | Polyaspartic ester resin solution | 38.37 | 28.18 | 17.83 |
| | VESTAMIN A 139 | 0.00 | 3.76 | 7.57 |
| | butyl acetate | 9.59 | 10.00 | 10.41 |
| | flow additives | 0.65 | 0.65 | 0.65 |
| | UV additives | 2.60 | 2.60 | 2.60 |
| | sum1 | 51.21 | 45.19 | 39.06 |
| Part B | Desmodur N 3300A | 19.88 | 22.91 | 25.97 |
| | 10 wt. % dibutyltin dilaurate in butyl acetate | 0.10 | 0.10 | 0.10 |
| | Other additives | 4.97 | 4.98 | 4.96 |
| | butyl acetate | 21.43 | 24.09 | 26.77 |
| | Mixing | Roll the above mixture in Part B first fully. Then add the amount of Capa ™ polyol shown below slowly in the course of 30 seconds to 1 hour under stirring to react with the isocyanate. The reaction can take about 1-12 hours to complete. Purge with Nitrogen. Mix the solution during reaction. | | |
| | Capa ™ 4101 | 2.40 | 2.76 | 3.13 |
| | sum2 | 48.79 | 54.81 | 60.94 |
| total | | 100 | 100 | 100 |

TABLE 7

Gloss retention of clearcoats of Table 5 after Amtec Test, and after baking at 60° C. for 1 hour or 80° C. for 2 hours post the Amtec Test.

| sample index | gloss retention after Amtec but before baking at 60° C. | gloss retention after Amtec and after baking at 60° C. for 1 h | gloss retention after Amtec but before baking at 80° C. | gloss retention after Amtec and after baking at 80° C. for 2 h |
|---|---|---|---|---|
| S1 | 64.9% | 70.4% | 61.2% | 67.2% |
| S2 | 70.1% | 75.7% | 64.1% | 70.9% |
| S3 | 73.4% | 76.5% | 71.9% | 73.8% |

TABLE 8

Formulations of adding Capa polyols to the activator portion B for aspartate clearcoat modification. Aldimine = 13.3 wt. % by solids and a ratio of NCO/(OH + NH) = 1.2.

| Example | polyol type | OH/NCO molar ratio |
|---|---|---|
| A | none | 0 |
| B | Capa ™ 3031 | 0.15 |
| C | Capa ™ 4101 | 0.08 |
| D | Capa ™ 4101 | 0.11 |

TABLE 9

Detailed formulations listed in Table 8.

| | | A | B | C | D |
|---|---|---|---|---|---|
| Part A | Polyaspartic ester resin solution | 26.54 | 20.48 | 22.40 | 20.69 |
| | VESTAMIN A 139 | 7.70 | 7.65 | 7.68 | 7.62 |
| | butyl acetate | 12.68 | 11.13 | 11.64 | 11.16 |
| | flow additives | 0.65 | 0.65 | 0.65 | 0.65 |
| | UV additives | 2.60 | 2.60 | 2.60 | 2.60 |
| | sum1 | 50.17 | 42.52 | 44.97 | 42.73 |
| Part B | Desmodur N 3300A | 23.14 | 25.41 | 23.70 | 23.90 |
| | 10% wt Dibutyltin dilaurate in butyl acetate | 0.10 | 0.10 | 0.10 | 0.10 |
| | Other additives | 4.71 | 4.72 | 4.70 | 4.71 |
| | butyl acetate | 21.89 | 25.25 | 24.17 | 25.16 |
| | Mixing | \multicolumn{4}{l}{Roll the above mixture in Part B first fully. Then add the amount of Capa ™ polyol shown below slowly in the course of 30 seconds to 1 hour under stirring to react with the isocyanate. The reaction can take about 1-12 hours to complete. Purge with Nitrogen. Mix the solution during reaction.} | | | |
| | Capa ™ 3031 | 0.00 | 2.00 | 0.00 | 0.00 |
| | Capa ™ 4101 | 0.00 | 0.00 | 2.36 | 3.40 |
| | sum2 | 49.83 | 57.48 | 55.03 | 57.27 |
| total | | 100.00 | 100.00 | 100.00 | 100.00 |

TABLE 10

Gloss retention of clearcoats in Table 8 after Amtec Test, and after baking at 60° C. for 1 hour post the Amtec Test.

| Example | After Amtec | After recovery at 60° C. × 1 h |
|---|---|---|
| A | 54% | 61% |
| B | 60% | 73% |
| C | 69% | 75% |
| D | 74% | 77% |

TABLE 11

Detailed formulation of example F (Aldimine = 13.3 wt.% by solids and a ratio of NCO/(OH + NH) = 1.27) and its gloss retention after Amtec Test, and after baking at 60° C. for 1 hour or 80° C. for 2 hours post the Amtec Test.

| | | F |
|---|---|---|
| Part A | Polyaspartic ester resin solution | 19.02 |
| | VESTAMIN A 139 | 7.62 |
| | butyl acetate | 10.74 |
| | flow additives | 0.65 |
| | UV additives | 2.60 |
| | sum1 | 40.64 |
| Part B | Desmodur N 3300A | 26.16 |
| | 10% wt Dibutyltin dilaurate in butyl acetate | 0.10 |
| | Other additives | 4.96 |
| | butyl acetate | 26.08 |
| | Mixing | Roll the above mixture in Part B first fully. Then add the amount of Capa ™ polyol shown below slowly in the course of 30 seconds to 1 hour under stirring to react with the isocyanate. The reaction can take about 1-12 hours to complete. Purge with Nitrogen. Mix the solution during reaction. |
| | Capa ™ 3031 | 2.06 |
| | sum2 | 59.36 |
| total | | 100 |

| sample index | gloss retention after Amtec but before baking at 60° C. | gloss retention after Amtec and after baking at 60° C. for 1 h | gloss retention after Amtec but before baking at 80° C. | gloss retention after Amtec and after baking at 80° C. for 2 h |
|---|---|---|---|---|
| F | 70.0% | 73.7% | 63.3% | 72.6% |

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It is understood that various changes may be made in the function and arrangement of elements described in an exemplary embodiment without departing from the scope of the disclosure as set forth in the appended claims.

What is claimed is:

1. A clearcoat composition comprising:
a binder portion A comprising a polyaspartic ester resin; and
an activator portion B comprising a polyol-modified isocyanate that is a reaction product of a polyisocyanate component and a polyol component that comprises polycaprolactone polyol, wherein the polyisocyanate component comprises homopolymer of hexamethylene diisocyanate (HDI) in an amount of greater than or equal to 95% by weight based on the total weight of the polyisocyanate component, and wherein the homopolymer of HDI comprises trimers of HDI, wherein the polycaprolactone polyol has a number average molecular weight ($M_N$) of from about 200 to about 2000, wherein when the clearcoat composition is substantially cured, the clearcoat composition has a gloss retention after scratch testing per DIN EN ISO 20566 (Amtec Test) of from about 60% to about 74% and after baking at 60° C. for 1 hour or at 80° C. for 2 hours post the Amtec Test of about 70% or greater.

2. The clearcoat composition of claim 1, wherein the polycaprolactone polyol has a functionality of from 2 to 4.

3. The clearcoat composition of claim 1, wherein the polycaprolactone polyol has an OH equivalent weight of from about 80 to about 1000 g/equivalents of OH.

4. The clearcoat composition of claim 1, wherein the polyol component further comprises at least one additional polyol and/or alcohol selected from polyester polyols, polyether polyols, polyacrylate polyols, polycarbonate polyols, polyurethane polyols, polyacetal polyols, polyester amide polyols, polythioether polyols, aliphatic dialcohols, trialcohols, tetra-functional alcohols, and combinations thereof.

5. The clearcoat composition of claim 4, wherein the polyol component is a mixture of polyols comprising the polycaprolactone polyol and the at least one additional polyol and/or alcohol, and wherein the mixture of polyols has a number average functionality of from about 1.5 to about 6.

6. The clearcoat composition of claim 1, wherein the binder portion A further comprises a reactive blocked amine diluent.

7. The clearcoat composition of claim 6, wherein the reactive blocked amine diluent is aldimine.

8. The clearcoat composition of claim 7, wherein aldimine is present in an amount of from about 0.1 to about 20 wt. % by solids of the clearcoat composition.

9. The clearcoat composition of claim 1, wherein the polyisocyanate component has —NCO reactive groups, the polyol component has —OH reactive groups, and wherein a molar ratio defined by (moles of the —OH reactive groups)/(moles of the —NCO reactive groups) is from about 0.01 to about 0.99.

10. The clearcoat composition of claim 1, wherein the polyisocyanate component has —NCO reactive groups, the polyol component has —OH reactive groups, and the polyaspartic ester resin has >NH reactive groups, and wherein the clearcoat composition has an isocyanate index defined by (moles of —NCO reactive groups)/(moles of —OH reactive groups+moles of >NH reactive groups) of from about 0.8 to about 2.

11. A clearcoat composition comprising:
a binder portion A comprising a polyaspartic ester resin; and
an activator portion B comprising a polyol-modified isocyanate that is a reaction product of a polyisocyanate component and a polyol component, wherein the polyisocyanate component has —NCO reactive groups, the polyol component has —OH reactive groups, and the polyaspartic ester resin has >NH reactive groups, wherein the clearcoat composition has an isocyanate index defined by (moles of —NCO reactive groups)/(moles of —OH reactive groups+moles of >NH reactive groups) of from about 0.8 to about 1.45, and wherein the polyisocyanate component comprises homopolymer of hexamethylene diisocyanate (HDI) in an amount of greater than or equal to 95% by weight based on the total weight of the polyisocyanate component, and wherein the homopolymer of HDI comprises trimers of HDI, wherein the polyol component has a number average molecular weight ($M_N$) of from about 200 to about 2000, wherein when the clearcoat composition is substantially cured, the clearcoat composition has a gloss retention after scratch testing per DIN EN ISO 20566 (Amtec Test) of from about 60% to about 74% and after baking at 60° C. for 1 hour or at 80° C. for 2 hours post the Amtec Test of about 70% or greater.

12. The clearcoat composition of claim 11, wherein the polyol component comprises one or more polyols and/or alcohols selected from polycaprolactone polyols, polyester polyols, polyether polyols, polyacrylate polyols, polycarbonate polyols, polyurethane polyols, polyacetal polyols, polyester amide polyols, polythioether polyols, aliphatic dialcohols, trialcohols, tetra-functional alcohols, and mixtures thereof.

13. The clearcoat composition of claim 11, wherein the clearcoat composition has the isocyanate index of from about 1 to about 1.45.

14. A method of forming a clearcoat composition, the method comprising the steps of:
forming a binder portion A that comprises a polyaspartic ester resin, wherein the polyaspartic ester resin has >NH reactive groups;
forming an activator portion B comprising:
providing a polyisocyanate component and a polyol component, wherein the polyisocyanate component has —NCO reactive groups, the polyol component has —OH reactive groups and comprises polycaprolactone polyol, and wherein the polyisocyanate component comprises homopolymer of hexamethylene diisocyanate (HDI) in an amount of greater than or equal to 95% by weight based on the total weight of the polyisocyanate component, and wherein the homopolymer of HDI comprises trimers of HDI, wherein the polycaprolactone polyol has a number average molecular weight ($M_N$) of from about 200 to about 2000; and
forming a polyol-modified isocyanate by reacting the polyol component with the polyisocyanate component; and
mixing the binder portion A and the activator portion B together to form the clear coat composition, wherein the clearcoat composition has an isocyanate index defined by (moles of —NCO reactive groups)/(moles of —OH reactive groups+moles of >NH reactive groups) of from about 0.8 to about 1.45, and wherein when the clearcoat composition is substantially cured, the clearcoat composition has a gloss retention after scratch testing per DIN EN ISO 20566 (Amtec Test) of from about 60% to about 74% and after baking at 60° C. for 1 hour or at 80° C. for 2 hours post the Amtec Test of about 70% or greater.

15. The method of claim 14, wherein forming the activator portion B comprises:
mixing an activator precursor portion that comprises the polyisocyanate component, wherein forming the polyol-modified isocyanate comprises incorporating the polyol component into the activator precursor portion during mixing.

16. The method of claim 15, wherein forming the polyol-modified isocyanate comprises incorporating the polyol component gradually into the activator precursor portion for a time of from about 30 seconds to about a few hours.

17. The method of claim 15, wherein forming the polyol-modified isocyanate comprises allowing the polyisocyanate component and the polyol component to react for a time of from about 1 to about 12 hours after incorporating the polyol component into the activator precursor portion and during mixing of the activator precursor portion to substantially fully consume the —OH groups of the polyol component by the excess —NCO groups of the polyisocyanate to form the polyol-modified isocyanate.

18. The method of claim 14, wherein forming the binder portion A comprises forming the binder portion A that comprises the polyaspartic ester resin (non-volatile components) present in an amount of from about 15 to about 60 wt. % based on the solids of the clearcoat composition, and wherein forming the activator portion B comprises:

providing the polyisocyanate component present in an amount of from about 20 to about 55 wt. % based on the solids of the clearcoat composition prior to forming the polyol-modified isocyanate; and providing the polyol component present in an amount of from about 1 to about 7 wt. % based on the solids of the clearcoat composition prior to forming the polyol-modified isocyanate.

19. The clearcoat composition of claim 1, wherein when the clearcoat composition is cured at 110° F. for about 10 minutes and allowed to age at room temperature for about two weeks before conducting the Amtec Test, the clearcoat composition has a gloss retention after the Amtec Test of from about 60% to about 74% and after baking at 60° C. for 1 hour or at 80° C. for 2 hours post the Amtec Test of about 70% or greater.

\* \* \* \* \*